United States Patent
Guo et al.

(10) Patent No.: US 10,939,069 B2
(45) Date of Patent: Mar. 2, 2021

(54) VIDEO RECORDING METHOD, ELECTRONIC DEVICE AND STORAGE MEDIUM

(71) Applicant: BEIJING KINGSOFT INTERNET SECURITY SOFTWARE CO., LTD., Beijing (CN)

(72) Inventors: Hongcai Guo, Beijing (CN); Ang Shao, Beijing (CN)

(73) Assignee: BEIJING KINGSOFT INTERNET SECURITY SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/542,624

(22) Filed: Aug. 16, 2019

(65) Prior Publication Data

US 2020/0007816 A1    Jan. 2, 2020

Related U.S. Application Data

(63) Continuation of application No. PCT/CN2017/109166, filed on Nov. 2, 2017.

(30) Foreign Application Priority Data

Feb. 20, 2017    (CN) .......................... 201710090187.2

(51) Int. Cl.
*H04N 5/76*  (2006.01)
*G11B 27/00*  (2006.01)
(Continued)

(52) U.S. Cl.
CPC ......... *H04N 5/9202* (2013.01); *G11B 27/036* (2013.01)

(58) Field of Classification Search
USPC .......................... 386/278, 280, 282, 314, 326
See application file for complete search history.

(56) References Cited

U.S. PATENT DOCUMENTS

| | | | |
|---|---|---|---|
| 2008/0037151 A1* | 2/2008 | Fujimoto | G11B 27/105 360/18 |
| 2013/0215292 A1* | 8/2013 | Reichelt | H04N 5/772 348/239 |

(Continued)

FOREIGN PATENT DOCUMENTS

| | | |
|---|---|---|
| CN | 103974209 A | 8/2014 |
| CN | 104811787 A | 7/2015 |
| CN | 106851385 A | 6/2017 |

OTHER PUBLICATIONS

International Search Report issued in corresponding International Application Na PCT/CN2017/109166 dated Jan. 4, 2018 (2 pages).
(Continued)

*Primary Examiner* — Daquan Zhao
(74) *Attorney, Agent, or Firm* — Osha Bergman Watanabe & Burton LLP

(57) ABSTRACT

Provided are a video-recording method and apparatus, and an electronic device. The method comprises: during the process of playing target videos, obtaining a plurality of first pictures by intercepting, an editing process carried out by a user on an edit panel, and obtaining a plurality of second pictures by respectively carrying out picture conversion on the played target videos multiple times; then, obtaining a plurality of frame images by respectively superimposing the plurality of first pictures with the corresponding second pictures; and then generating recorded video segments according to a video stream obtained by synthesizing the plurality of frame images and an audio stream of target videos, thereby satisfying personalized requirements of users during a video-recording process.

16 Claims, 4 Drawing Sheets

(51) Int. Cl.
*H04N 5/92* (2006.01)
*G11B 27/036* (2006.01)
*H04N 5/00* (2011.01)
*H04N 5/91* (2006.01)

(56) References Cited

U.S. PATENT DOCUMENTS

2015/0290540 A1* 10/2015 Trombetta .............. A63F 13/00
      463/31
2015/0334347 A1  11/2015 Kang et al.
2017/0034237 A1*  2/2017 Silver .................... H04N 5/272

OTHER PUBLICATIONS

Written Opinion issued in corresponding International Application No. PCT/CN2017/109166 dated Jan. 4, 2018 (5 pages).
Office Action issued in corresponding Chinese Application No. 201710090187.2 dated Mar. 18, 2019, and English translation thereof (12 pages).

* cited by examiner

VIDEO RECORDING METHOD, ELECTRONIC DEVICE AND STORAGE MEDIUM

CROSS-REFERENCE TO RELATED APPLICATION

This application a continuation application of International Application No. PCT/CN2017/109166, filed on Jul. 2, 2017, which claims the priority of the Chinese Patent Application No. "201710090187.2" filed on Feb. 20, 2017 by BEIJING KINGSOFT INTERNET SECURITY SOFTWARE CO., LTD., entitled "Video-Recording Method and Apparatus, and Electronic Device".

TECHNICAL FIELD

The present disclosure relates to the field of mobile terminal technologies, and in particular, to a video recording method, an electronic device and a storage medium.

BACKGROUND

When users watch a video or play a game using a mobile terminal, there are often some exciting moments that they wish to record. For example, when the users watch a live video, they would like to record and repeatedly play a video clip that they like or is hosted by their favorite anchors.

Based on the screen recording technology, the mobile terminal may record the currently playing content such as a video, a game, and the like, thereby satisfying the user's requirement of repeatedly viewing. However, in the prior art, only the content which is currently played is recorded, and the recorded content is completely consistent with the content played on the mobile terminal, which cannot meet the user's personalized needs.

SUMMARY

The present disclosure aims to solve at least one of the technical problems in the related art to some extent.

Embodiments of the present disclosure provide a video recording method, including: during a process of playing a target video, performing a screenshot when a user edits on an editing panel to acquire a plurality of first images, and performing an image conversion on the target video for a plurality of times to acquire a plurality of second images; superimposing the plurality of first images with the plurality of second images correspondingly to acquire a plurality of frame images; and generating a recorded video clip according to a video stream acquired by synthesizing the plurality of frame images and an audio stream of the target video.

Embodiments of the present disclosure provide an electronic device, including: one or more processors; a memory storing instructions executable by the one or more processors; in which the one or more processors are configured to: perform, during a process of playing a target video, a screenshot when a user edits on an editing panel to acquire a plurality of first images, and perform an image conversion on the target video for a plurality of times to acquire a plurality of second images; superimpose the plurality of first images with the plurality of second images correspondingly to acquire a plurality of frame images; and generate a recorded video clip according to a video stream acquired by synthesizing the plurality of frame images and an audio stream of the target video.

Embodiments of the present disclosure also provide a non-transient computer readable storage medium having instructions stored thereon that, when executed, performs a video recording method, in which the method may include: during a process of playing a target video, performing a screenshot when a user edits on an editing panel to acquire a plurality of first images, and performing an image conversion on the target video for a plurality of times to acquire a plurality of second images; superimposing the plurality of first images with the plurality of second images correspondingly to acquire a plurality of frame images; and generating a recorded video clip according to a video stream acquired by synthesizing the plurality of frame images and an audio stream of the target video.

The additional aspects and advantages of the disclosure will be set forth in part in the description which follows.

BRIEF DESCRIPTION OF THE DRAWINGS

The above and/or additional aspects and advantages of the present disclosure will become apparent and readily understood from the following description of embodiments with reference to the figures.

DETAILED DESCRIPTION

Figure 1:
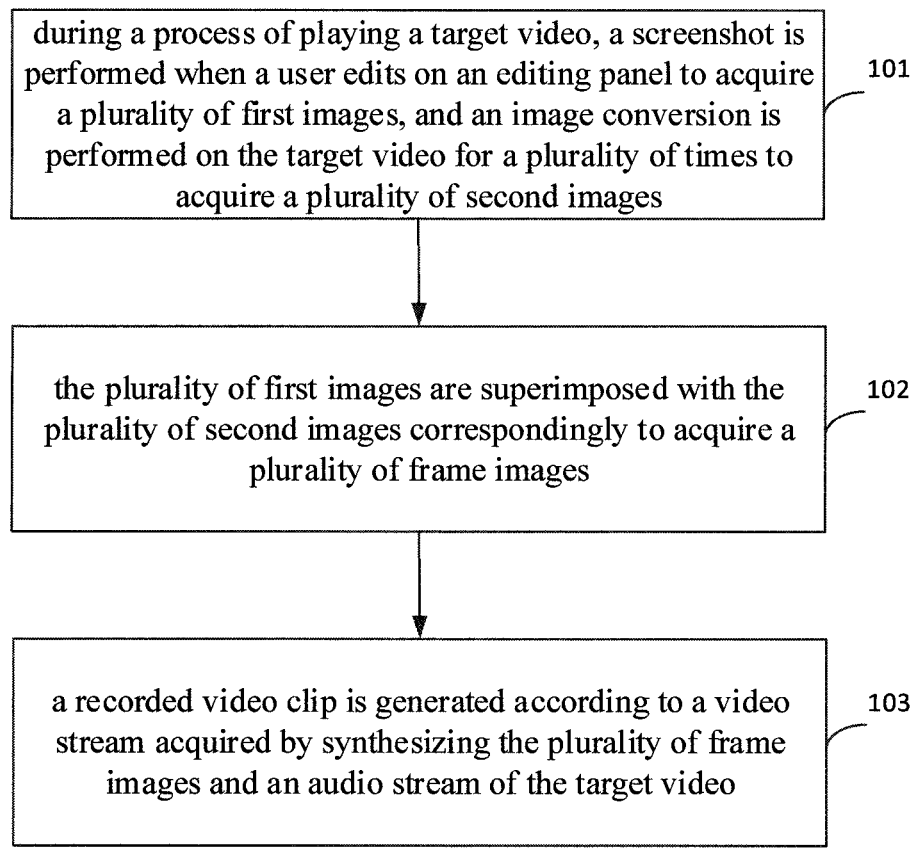
FIG. 1 is a schematic flowchart of a video recording method according to an embodiment of the present disclosure.

Embodiments of the present disclosure are described in detail below, and the examples of the embodiments are illustrated in the drawings, in which the same or similar reference numerals are used to refer to the same or similar elements or elements having the same or similar functions. The embodiments described below with reference to the accompanying drawings are intended to be illustrative, and are not to be construed as limitations.

A video recording method and apparatus, and an electronic device of embodiments of the present disclosure are described below with reference to the accompanying drawings.

FIG. 1 is a schematic flowchart of a video recording method according to an embodiment of the present disclosure. The method provided in this embodiment may be applied to video recording in a live scene, and may also be applied to video recording in a game scene. It may also be applied to video recording in a video chat scene. In this embodiment, the application scenes for video recording will not be limited.

As shown in FIG. 1, the video recording method includes the followings.

At block 101, during a process of playing a target video, a screenshot is performed when a user edits on an editing panel to acquire a plurality of first images, and an image conversion is performed on the target video for a plurality of times to acquire a plurality of second images.

The editing panel includes a drawing area for content editing and an option area for selecting an editing control. The drawing area is a transparent layer overlaid on the target video.

Specifically, during the process of playing the target video, when an operation of starting recording is detected, the system time point at which the operation of starting the recording is detected is recorded as the starting time point. From the starting time point, the image conversion is performed on the target video, and in each image conversion, a difference between a time point of the image conversion and the starting time point is calculated, and the difference is determined as a timestamp of the second image obtained by the image conversion. At the same time, in each image conversion to obtain the second image, the content edited by the user on the editing panel is screenshotted to obtain the corresponding first image, in which the second image has a timestamp same as that of the corresponding first image.

Further, the audio stream of the target video is recorded from the starting time point, and a difference between a time point of playing an audio clip in the audio stream and the starting time point is determined as a timestamp of the audio clip. When an operation of ending the recording is detected, the image conversion and recording the audio stream of the target video are stopped.

At block 102, the plurality of first images are superimposed with the plurality of second images correspondingly to acquire a plurality of frame images.

Specifically, the first image and the second image having the same timestamp have a corresponding relation, and the first image is respectively superimposed with the corresponding second image to obtain a frame image, and the timestamp of the frame image is the timestamp of the first and second image which are superimposed to obtain the frame image.

As a possible implementation, since the second image includes non-transparent content edited by the user, a graffiti effect may be formed by superimposing the non-transparent content directly on the first image.

As another possible implementation, the first image may be copied to obtain a plurality of non-transparent contents, and a stamp effect may be formed by superimposing the plurality of non-transparent contents directly on the first image.

At block 103, a recorded video clip is generated according to a video stream acquired by synthesizing the plurality of frame images and an audio stream of the target video.

Specifically, for each frame image, the frame images are synthesized according to the order of the timestamps of the frame images on the time axis of the video to obtain a video stream. When synthesizing the video stream and the audio stream, a time-axis synchronization is performed on the timestamp of each audio clip in the audio stream and the timestamp of each frame image in the video stream to obtain a recorded video clip.

In a possible application scene, the method provided in this embodiment may be performed by a mobile terminal based on an IOS operating platform. The IOS is a mobile operating system developed by Apple, mainly used for mobile devices such as an iPhone or an iPad. The IOS operating platform may provide a method for generating a specified visual control (UIView) and a sub-UIView included therein as one image. In this embodiment, in each image conversion, the mobile terminal adopts this method to convert the UIView pre-specified by the user and the included sub-UIView into an image, so as to complete the image conversion and acquire the converted image.

When specifying the UIView, the user may specify all or a part of the UIViews in the screen on which the target video is displayed, which will not be limited in this embodiment.

In this embodiment, during the process of playing the target video, the editing process performed by the user on the editing panel is screenshotted to obtain a plurality of first images, and an image conversion is performed on the target video for a plurality of times to acquire a plurality of second images; the plurality of first images are superimposed with the plurality of second images correspondingly to acquire a plurality of frame images; and a recorded video clip is generated according to a video stream acquired by synthesizing the plurality of frame images and an audio stream of the target video, thereby satisfying the user's individual requirements during video recording.

Figure 2:
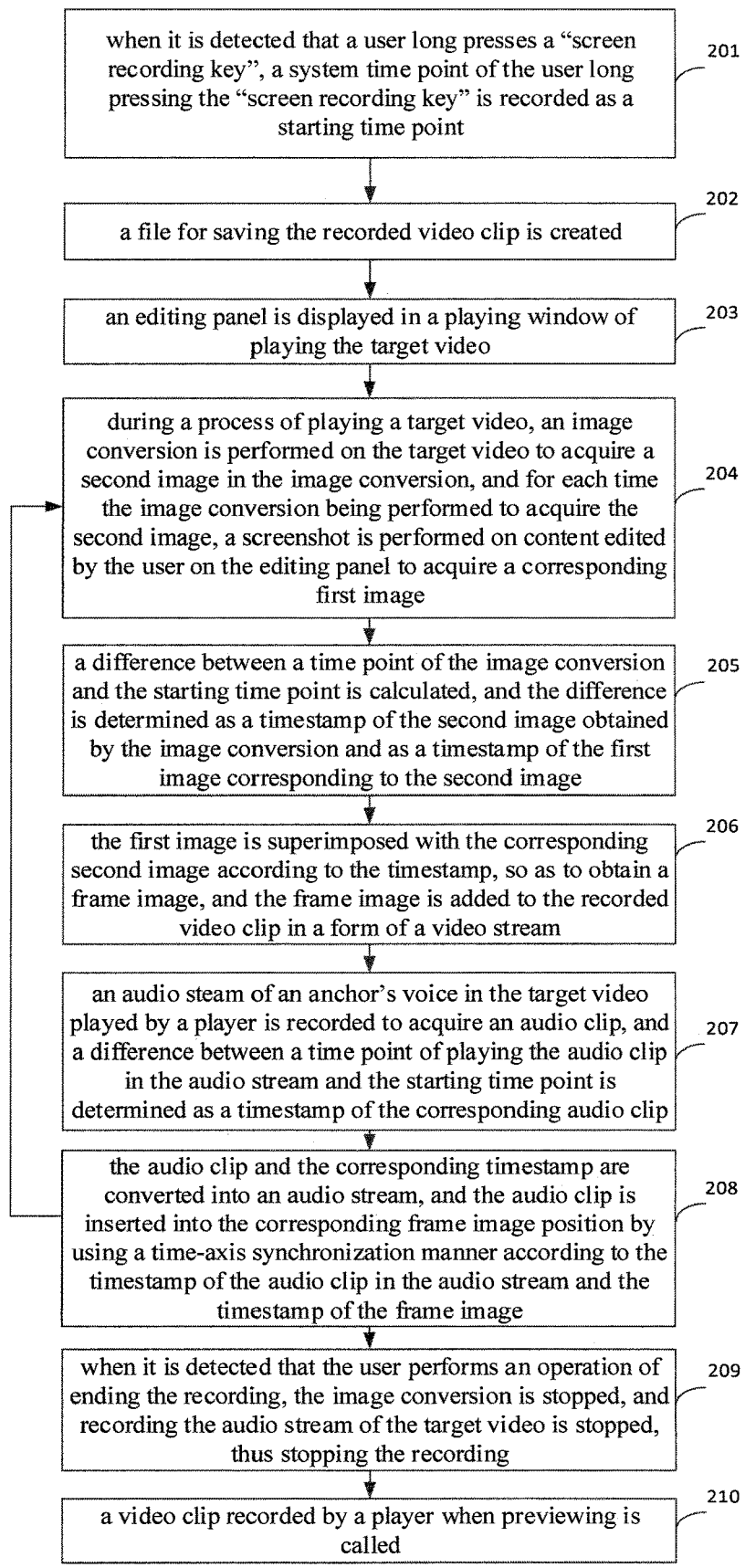
FIG. 2 is a schematic flowchart of a video recording method according to another embodiment of the present disclosure.

In order to clearly illustrate the previous embodiment, this embodiment provides another video recording method. The method provided in this embodiment may be applied to an application scene of live broadcasting for recording a live video. FIG. 2 is a schematic flowchart of a video recording method provided in another embodiment of the present disclosure. As shown in FIG. 2, the video recording method includes the followings.

At block 201, when it is detected that a user long presses a "screen recording key", a system time point of the user long pressing the "screen recording key" is recorded as a starting time point.

Specifically, in this embodiment, the long pressing the "screen recording key" is an operation of starting recording, and when it is detecting that the user long presses the "screen recording key", the video recording task is started. The video recording task starts a timer, thereby performing multiple image conversions for the played target video at a preset time interval, and performing multiple image screenshots on the editing content edited by the user on an editing panel and recording the audio steam of the target video. Since the timestamp of each frame image needs to be determined according to the system time point when the video is generated, the video recording task needs to record the current time point (startTime) of the system as the starting time point when starting the video recording task.

At block 202, a file for saving the recorded video clip is created.

Specifically, the video recording task creates a file which is used to save the final recorded video clip in the file system of the mobile terminal. Generally, the video recording task names the file with a fixed name. Therefore, as a possible implementation, if the file with the name does not exist in the file system of the mobile terminal, a new file is created in the file system. As another implementation, if the file with the name already exists in the file system of the mobile terminal, a file with the name is created in the file system after deleting the existing file. After creating the file, the audio stream input source and video stream input source of the target video are turned on, and it is ready to start the recording.

At block 203, an editing panel is displayed in a playing window of playing the target video.

Specifically, the editing panel includes a drawing area for content editing, and an option area for selecting an editing control. The drawing area is a transparent layer overlaying the target video in full screen, and multiple editing controls are displayed in the option area, in which the editing controls are used to select an attribute of drawing. For example, the editing control may be used to select the attributes of the drawn lines, such as thickness and color. Therefore, when the user edits in the drawing area, the user may draw along the touch track according to the pre-selected drawing attributes.

At block 204, during a process of playing a target video, an image conversion is performed on the target video to acquire a second image in the image conversion, and for each time the image conversion being performed to acquire the second image, a screenshot is performed on content edited by the user on the editing panel to acquire a corresponding first image.

Specifically, the video recording task converts the specified visual controls on the screen into corresponding control images, and then the control images are synthesized into one image to acquire the second image according to the relative positions among the visual controls. In this embodiment, for each time the image conversion being performed to acquire the second image, the screenshot is performed on content edited by the user on the editing panel to acquire the corresponding first image.

In the specific implementation process, since the screenshot is performed on content edited by the user on the editing panel to acquire a corresponding first image for each time the image conversion being performed to acquire a second image during the process of playing the target video, the same timer may be used for both the image conversion and the content screenshot, and when the timing period is reached, the image conversion and the content screenshot are performed, thereby obtaining a first image and a second image having the corresponding relation.

It should be noted that, in order to achieve a better recording effect, when screenshotting the content edited by the user on the editing panel, only the content in the drawing area is screenshotted, and the content in the option area is not screenshotted. Similarly, when performing the image conversion on the target video, the image conversion is generally not performed on the screen recording key.

At block 205, a difference between a time point of the image conversion and the starting time point is calculated, and the difference is determined as a timestamp of the second image obtained by the image conversion and as a timestamp of the first image corresponding to the second image.

Specifically, the video recording task records the difference ($\Delta vt$=currentTime-startTime) between the time point of the current image conversion (i.e., the current time point (currentTime)) and the starting time point (startTime), and the difference ($\Delta vt$) is determined as the timestamp of the second image obtained by the image conversion and as the timestamp of the first image corresponding to the second image.

At block 206, the first image is superimposed with the corresponding second image according to the timestamp, so as to obtain a frame image, and the frame image is added to the recorded video clip in a form of a video stream.

Specifically, the video recording task superimposes the second image obtained by the image conversion with the first image having the same timestamp as different layers to obtain a frame image, and the timestamp of the frame image is the timestamp of the first image and the timestamp of the second image. The frame image is bound to the timestamp ($\Delta vt$) of the frame image, and then a frame image in an operating system specific data type is obtained, and the frame image is added to the recorded video clip in the form of the video stream.

At block 207, an audio steam of an anchor's voice in the target video played by a player is recorded to acquire an audio clip, and a difference between a time point of playing the audio clip in the audio stream and the starting time point is determined as a timestamp of the corresponding audio clip.

At block 208, the audio clip and the corresponding timestamp are converted into an audio stream, and the audio clip is inserted into the corresponding frame image position by using a time-axis synchronization manner according to the timestamp of the audio clip in the audio stream and the timestamp of the frame image.

It should be noted that, during the recording process, acts in blocks 204-208 need to be repeatedly performed until the recording ends or is paused.

At block 209, when it is detected that the user performs an operation of ending the recording, the image conversion is stopped, and recording the audio stream of the target video is stopped, thus stopping the recording.

In this embodiment, specifically, the operation of ending the recording is releasing the "screen recording key".

Specifically, when it is detected that the user performs the operation of releasing the "screen recording key", the timer is turned off, the audio stream input source is turned off, and the video recording task ends.

At block 210, a video clip recorded by a player when previewing is called.

Further, after the preview, a control for sharing, saving, or canceling the video clip is displayed, and the user selects a desired operation from sharing, saving, or canceling.

For example, the user may draw a portrait in the live process, and thus the recorded video clip includes both the process of the anchor's live broadcasting and the process of the user drawing the portrait. After previewing the video clip, the user may share the video clip to the anchor or other users, thereby realizing an interaction between the user and the anchor or other users, and improving the user experience.

In this embodiment, during the process of playing the target video, the editing process performed by the user on the editing panel is screenshotted to obtain a plurality of first images, and an image conversion is performed on the target video for a plurality of times to acquire a plurality of second images; the plurality of first images are superimposed with the plurality of second images correspondingly to acquire a plurality of frame images; and a recorded video clip is generated according to a video stream acquired by synthesizing the plurality of frame images and an audio stream of the target video, thereby satisfying the user's individual requirements during video recording.

In order to implement the above embodiments, the present disclosure also proposes a video recording apparatus.

Figure 3:
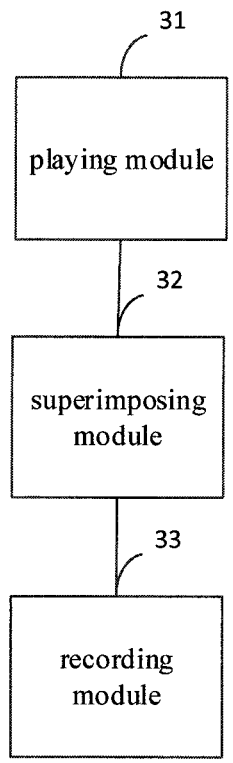
FIG. 3 is a schematic structural diagram of a video recording apparatus according to an embodiment of the present disclosure.

FIG. 3 is a schematic structural diagram of a video recording apparatus according to an embodiment of the present disclosure. As shown in FIG. 3, the video recording apparatus includes: a playing module 31, a superimposing module 32, and a recording module 33.

The playing module 31 is configured to perform, during a process of playing a target video, a screenshot when a user edits on an editing panel to acquire a plurality of first images, and perform an image conversion on the target video for a plurality of times to acquire a plurality of second images.

The editing panel includes a drawing area for content editing and an option area for selecting an editing control. Optionally, the drawing area is a transparent layer overlaid on the target video.

The superimposing module 32 is configured to superimpose the plurality of first images with the plurality of second images correspondingly to acquire a plurality of frame images.

The recording module 33 is configured to generate a recorded video clip according to a video stream acquired by synthesizing the plurality of frame images and an audio stream of the target video.

Figure 4:
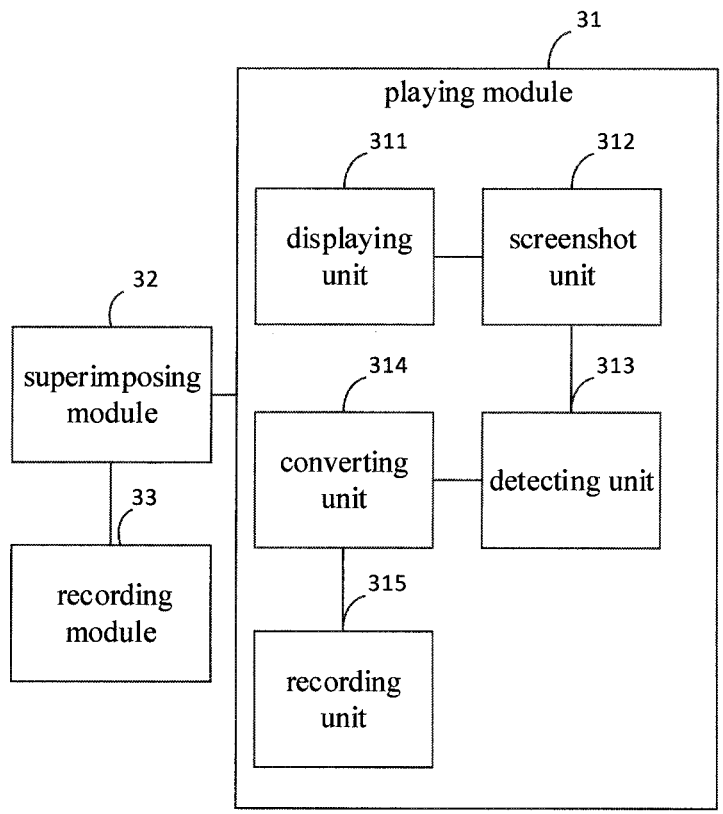
FIG. 4 is a schematic structural diagram of a video recording apparatus according to another embodiment of the present disclosure.

Based on the foregoing embodiment, as a possible implementation, an embodiment of the present disclosure also provides another video recording apparatus. FIG. 4 is a schematic structural diagram of a video recording apparatus according to another embodiment of the present disclosure. On the basis of FIG. 3, as shown in FIG. 4, the playing module 31 includes a displaying unit 311, a screenshot unit 312, a detecting unit 313, a converting unit 314, and a recording unit 315.

The displaying unit 311 is configured to display the editing panel on a playing window of playing the target video when it is detected that the user performs an operation of starting recording.

The screenshot unit 312 is configured to perform, during the process of playing the target video and for each time the image conversion being performed to acquire a second image, a screenshot on content edited by the user on the editing panel to acquire a corresponding first image.

The second image has a timestamp same as that of the corresponding first image.

The detecting unit 313 is configured to record, during the process of playing the target video and when it is detected that the user performs an operation of starting recording, a system time point at which the operation of starting the recording is detected as a starting time point.

The converting unit 314 is configured to perform the image conversion on the target video from the starting time point, and in each image conversion, to calculate a difference between a time point of the image conversion and the starting time point, and determine the difference as a timestamp of the second image obtained by the image conversion.

Specifically, the converting unit 314 is specifically configured to: when performing the image conversion on the target video, convert target visual controls preset in a screen on which the target video is displayed into control images; and synthesize the control images, generate a second image obtained by the image conversion.

The recording unit 315 is configured to record the audio stream of the target video from the starting time point, and to determine a difference between a time point of playing an audio clip in the audio stream and the starting time point as a timestamp of the audio clip; and when it is detected that the user performs an operation of ending the recording, to stop the image conversion and to stop recording the audio stream of the target video.

Further, a timestamp of the frame image is same as the timestamps of the first image and the second image which are superimposed to acquire the frame image.

Based on this, the recording module 33 is specifically configured to: when synthesizing the video stream and the audio stream, perform a time-axis synchronization on the timestamps of audio clips in the audio steam and timestamps of the plurality of frame images in the video steam to acquire the recorded video clip.

In this embodiment, during the process of playing the target video, the editing process performed by the user on the editing panel is screenshotted to obtain a plurality of first images, and an image conversion is performed on the target video for a plurality of times to acquire a plurality of second images; the plurality of first images are superimposed with the plurality of second images correspondingly to acquire a plurality of frame images; and a recorded video clip is generated according to a video stream acquired by synthesizing the plurality of frame images and an audio stream of the target video, thereby satisfying the user's individual requirements during video recording.

In the description of the present specification, the description with reference to the terms "one embodiment", "some embodiments", "example", "specific example", or "some examples" and the like means that specific features, structures, material or characteristics described in connection with the embodiment or example may be included in at least one embodiment or example of the present disclosure. In the present specification, the schematic representation of the above terms is not necessarily directed to the same embodiment or example. Furthermore, the particular features, structures, materials, or characteristics described may be combined in a suitable manner in any one or more embodiments or examples. In addition, various embodiments or examples described in the specification and features of various embodiments or examples may be combined and combined without departing from the scope of the disclosure.

Moreover, terms "first" and "second" are used for descriptive purposes only and are not to be construed as indicating or implying a relative importance or implicitly indicating the number of technical features indicated. Thus, features defining "first" and "second" may include at least one of the features, either explicitly or implicitly. In the description of the present disclosure, the meaning of "a plurality of" is at least two, such as two, three, etc., unless specifically defined otherwise.

Any process or method description in the flowcharts or otherwise described herein may be understood to represent a module, segment or portion of code including one or more executable instructions for implementing the steps of a particular logical function or process. The scope of the preferred embodiments of the disclosure includes additional implementations, in which the functions may be performed in a substantially simultaneous manner or in an opposite order depending on the functions involved, instead of in the order shown or discussed. It will be understood by those skilled in the art to which the embodiments of the present disclosure pertain.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The above mentioned storage medium may be a read only memory, a magnetic disk or an optical disk or the like. Although the embodiments of the present disclosure have been shown and described, it is understood that the above-described embodiments are illustrative and are not to be construed as limiting the scope of the disclosure. Various changes and modifications of the present disclosure may be made without departing from the spirit and scope of the present disclosure should be included in the scope of the present disclosure.

An embodiment of the present disclosure further provides an electronic device. The electronic device includes the apparatus described in any of the foregoing embodiments.

Figure 5:
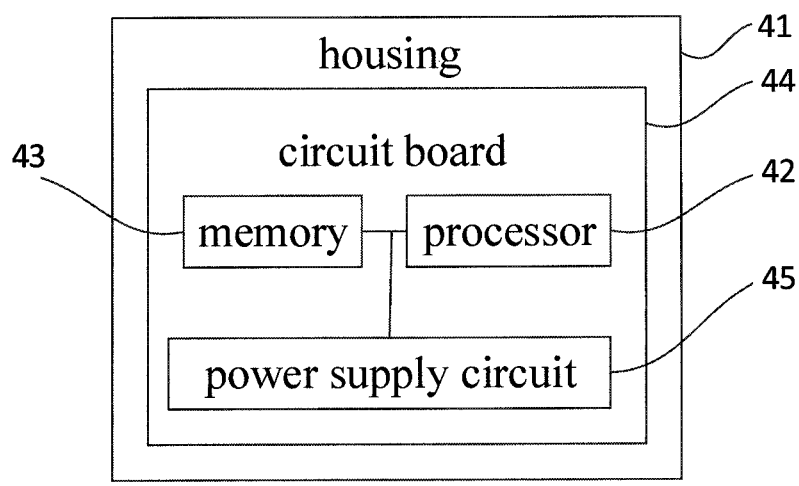
FIG. 5 is a schematic structural diagram of an electronic device according to an embodiment of the present disclosure.

FIG. 5 is a schematic structural diagram of an electronic device according to an embodiment of the present disclosure, which may implement the process of the embodiment shown in FIGS. 1-4 of the present disclosure. As shown in FIG. 5, the electronic device may include: a housing 41, a processor 42, a memory 43, a circuit board 44 and the power supply circuit 45. The circuit board 44 is disposed inside a space enclosed by the housing 41, the processor 42 and the memory 43 are disposed on the circuit board 44, and the power supply circuit 45 is configured to supply power to each circuit or component of the electronic device. The memory 43 is configured to store an executable program code. The processor 42 is configured to execute a program corresponding to the executable program coder by reading the executable program code stored in the memory 43, and the processor 42 is caused to perform the any of the video recording method described in foregoing embodiments.

The process of the processor 42 performing the above steps and executing steps by running executable program codes may refer to the description of the embodiment shown in FIGS. 1-5 of the present disclosure, which will not be described in detail herein.

The electronic device exists in a variety of forms including, but not limited to:
(1) Mobile communication devices: These devices are characterized by mobile communication functions and are mainly aimed at providing voice and data communication. Such terminals include: smart phones (such as iPhone), multimedia phones, functional phones, and low-end phones.
(2) Ultra-mobile PC devices: These devices belong to the category of personal computers, have computing and processing functions, and generally have mobile Internet access. Such terminals include: PDAs, MIDs, and UMPC devices, such as iPad.
(3) Portable entertainment devices: These devices may display and play multimedia content. Such devices include: audio or video players (such as iPod), hand-held game consoles, e-books, and smart toys and portable car navigation devices.
(4) Server: A device that provides computing services. The server consists of a processor, a hard disk, a memory, a system bus, etc. The server is similar to a general-purpose computer architecture, but because of the need to provide highly reliable services, the processing power, stability, reliability, security, scalability, manageability and other aspects are highly required.
(5) Other electronic devices with data interaction capabilities.

One of ordinary skill in the art may understand that all or part of the process of implementing the foregoing embodiments may be completed by a computer program to instruct related hardware, and the program can be stored in a computer readable storage medium. When executed, the flow of an embodiment of the methods as described above may be included. The storage medium may be a magnetic disk, an optical disk, a read-only memory (ROM), or a random access memory (RAM).

The above descriptions are merely specific embodiments of the present disclosure, but the scope of the present disclosure is not limited thereto, and any person skilled in the art may easily appreciate changes or substitutions within the technical scope of the present disclosure, which should be covered by the scope of the present disclosure. Therefore, the scope of protection of the present disclosure should be determined by the scope of the claims.

What is claimed is:
1. A video recording method, comprising:
during a process of playing a target video, performing a screenshot when a user edits on an editing panel to acquire a plurality of first images, and performing an image conversion on the target video for a plurality of times to acquire a plurality of second images;
superimposing the plurality of first images with the plurality of second images correspondingly to acquire a plurality of frame images; and
generating a recorded video clip according to a video stream acquired by synthesizing the plurality of frame images and an audio stream of the target video,
wherein performing the screenshot when the user edits on the editing panel to acquire the plurality of first images comprises:

displaying the editing panel on a playing window of playing the target video when it is detected that the user performs an operation of starting recording, and wherein the editing panel comprises a drawing area for performing content editing, and an option area for selecting an attribute of drawing in the drawing area.

2. The video recording method according to claim 1, wherein performing the screenshot when the user edits on the editing panel to acquire the plurality of first images comprises:

during the process of playing the target video, for each time the image conversion being performed to acquire a second image, performing a screenshot on content edited by the user on the editing panel to acquire a corresponding first image, in which the second image has a timestamp same as that of the corresponding first image.

3. The video recording method according to claim 2, wherein performing the image conversion on the target video for the plurality of times to acquire the plurality of second images comprises:

during the process of playing the target video, when it is detected that the user performs an operation of starting recording, recording a system time point at which the operation of starting the recording is detected as a starting time point; and performing the image conversion on the target video from the starting time point, and in each image conversion, calculating a difference between a time point of the image conversion and the starting time point, and determining the difference as a timestamp of the second image obtained by the image conversion.

4. The video recording method according to claim 1, wherein the drawing area is a transparent layer overlying the target video.

5. The video recording method according to claim 1, wherein performing the image conversion on the target video for the plurality of times to acquire the plurality of second images comprises:

during the process of playing the target video, when it is detected that the user performs an operation of starting recording, recording a system time point at which the operation of starting the recording is detected as a starting time point; and performing the image conversion on the target video from the starting time point, and in each image conversion, calculating a difference between a time point of the image conversion and the starting time point, and determining the difference as a timestamp of the second image obtained by the image conversion.

6. The video recording method according to claim 5, wherein after recording the system time point at which the operation of starting the recording is detected as the starting time point, the video recording method further comprises:

recording the audio stream of the target video from the starting time point, and determining a difference between a time point of playing an audio clip in the audio stream and the starting time point as a timestamp of the audio clip; and when it is detected that the user performs an operation of ending the recording, stopping the image conversion and stopping recording the audio stream of the target video.

7. The video recording method according to claim 6, wherein a timestamp of the frame image is same as the timestamps of the first image and the second image which are superimposed to acquire the frame image; generating the recorded video clip according to the video stream acquired by synthesizing the plurality of frame images and the audio stream of the target video comprises:

when synthesizing the video stream with the audio stream, performing a time-axis synchronization on the timestamps of audio clips in the audio steam and timestamps of the plurality of frame images in the video steam to acquire the recorded video clip.

8. The video recording method according to claim 1, wherein performing the image conversion on the target video for the plurality of times to acquire the plurality of second images comprises:

when performing the image conversion on the target video, converting preset target visual controls displayed in a screen including the target video into control images; and synthesizing the control images to generate the second image after the image conversion.

9. An electronic device, comprising: one or more processors; a memory storing instructions executable by the one or more processors; wherein the one or more processors are configured to:

perform, during a process of playing a target video, a screenshot when a user edits on an editing panel to acquire a plurality of first images, and perform an image conversion on the target video for a plurality of times to acquire a plurality of second images;

superimpose the plurality of first images with the plurality of second images correspondingly to acquire a plurality of frame images; and generate a recorded video clip according to a video stream acquired by synthesizing the plurality of frame images and an audio stream of the target video, wherein performing the screenshot when the user edits on the editing panel to acquire the plurality of first images comprises:

displaying the editing panel on a playing window of playing the target video when it is detected that the user performs an operation of starting recording, and wherein the editing panel comprises a drawing area for performing content editing, and an option area for selecting an attribute of drawing in the drawing area.

10. The electronic device according to claim 9, wherein the one or more processors perform the screenshot when the user edits on the editing panel to acquire the plurality of first images by performing acts of:

performing, during the process of playing the target video and for each time the image conversion being performed to acquire a second image, a screenshot on content edited by the user on the editing panel to acquire a corresponding first image, in which the second image has a timestamp same as that of the corresponding first image.

11. The electronic device according to claim 9, wherein the drawing area is a transparent layer overlying the target video.

12. The electronic device according to claim 9, wherein the one or more processors perform the image conversion on the target video for the plurality of times to acquire the plurality of second images by performing acts of:

recording, during the process of playing the target video and when it is detected that the user performs an operation of starting recording, a system time point at which the operation of starting the recording is detected as a starting time point; and performing the image conversion on the target video from the starting time point, and in each image conversion, calculating a difference between a time point of the image conversion and the starting time point, and determining the difference as a timestamp of the second image obtained by the image conversion.

13. The electronic device according to claim 12, wherein after recording the system time point at which the operation of starting the recording is detected as the starting time point, the one or more processors are further configured to:
record the audio stream of the target video from the starting time point, and to determine a difference between a time point of playing an audio clip in the audio stream and the starting time point as a timestamp of the audio clip; and, when it is detected that the user performs an operation of ending the recording, stop the image conversion and to stop recording the audio stream of the target video.

14. The electronic device according to claim 13, wherein a timestamp of the frame image is same as the timestamps of the first image and the second image which are superimposed to acquire the frame image; and the one or more processors generate the recorded video clip according to the video stream acquired by synthesizing the plurality of frame images and the audio stream of the target video by performing acts of: when synthesizing the video stream with the audio stream, performing a time-axis synchronization on the timestamps of audio clips in the audio steam and timestamps of the plurality of frame images in the video steam to acquire the recorded video clip.

15. The electronic device according to claim 9, wherein the one or more processors perform the image conversion on the target video for the plurality of times to acquire the plurality of second images by performing acts of:

when performing the image conversion on the target video, converting preset target visual controls displayed in a screen including the target video into control images; and
synthesizing the control images to generate the second image after the image conversion.

16. A non-transitory computer readable storage medium having instructions stored thereon that, when executed, performs a video recording method, wherein the method comprises:
during a process of playing a target video, performing a screenshot when a user edits on an editing panel to acquire a plurality of first images, and performing an image conversion on the target video for a plurality of times to acquire a plurality of second images;
superimposing the plurality of first images with the plurality of second images correspondingly to acquire a plurality of frame images; and
generating a recorded video clip according to a video stream acquired by synthesizing the plurality of frame images and an audio stream of the target video,
wherein performing the screenshot when the user edits on the editing panel to acquire the plurality of first images comprises:
displaying the editing panel on a playing window of playing the target video when it is detected that the user performs an operation of starting recording, and
wherein the editing panel comprises a drawing area for performing content editing, and an option area for selecting an attribute of drawing in the drawing area.

* * * * *